Figure 1:
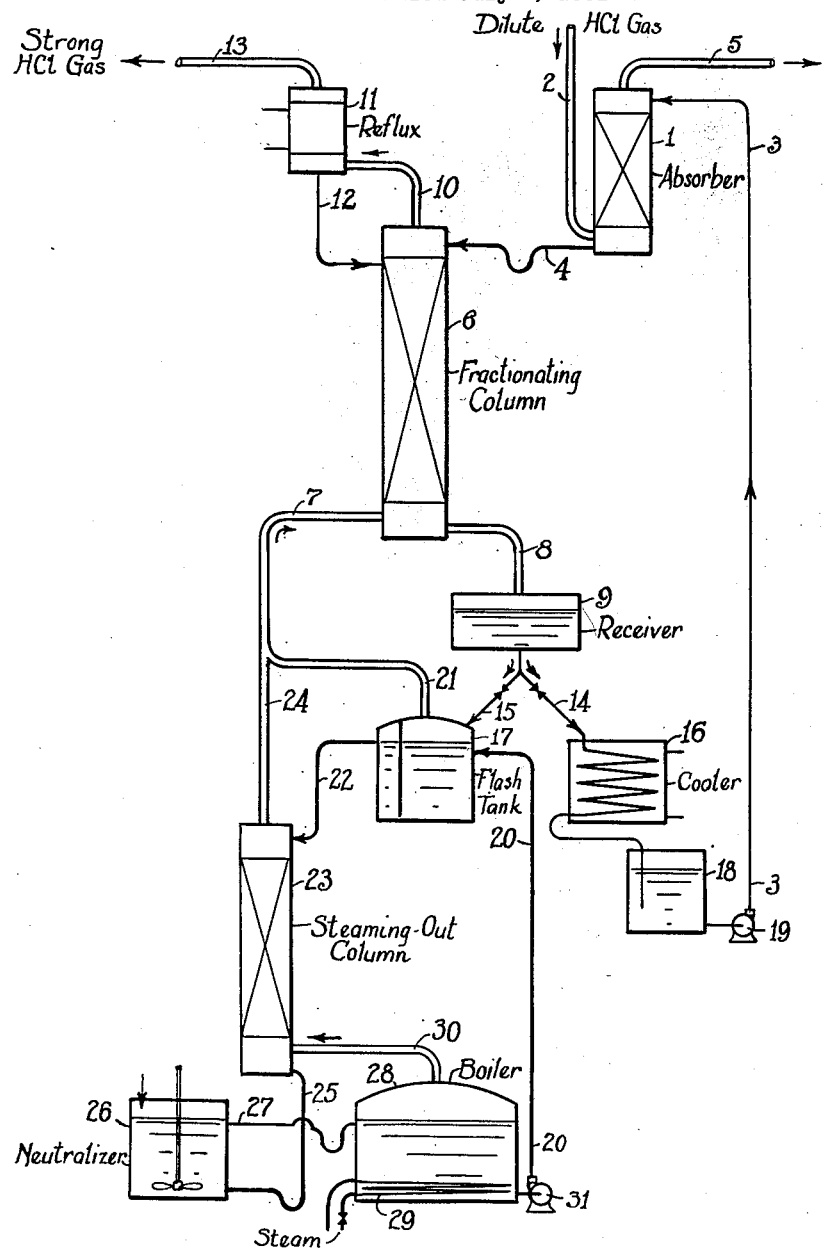

May 2, 1933.  S. B. HEATH  1,906,467

DISTILLING HYDROCHLORIC ACID

Filed July 9, 1931

INVENTOR
BY Sheldon B. Heath
Thomas Griswold, Jr.
ATTORNEY

Patented May 2, 1933

1,906,467

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

DISTILLING HYDROCHLORIC ACID

Application filed July 9, 1931. Serial No. 549,677.

The present invention relates to the distillation of aqueous hydrochloric acid solutions. More particularly, it comprises a novel and economical method of preparing a strong hydrochloric acid gas from a weak acid gas.

In order to prepare a strong hydrochloric acid gas from a gaseous mixture of such acid with air or other inert diluent gases the customary procedure has been to absorb the acid in water or a dilute aqueous acid solution to form a concentrated solution, and then to treat the latter with strong sulphuric acid to liberate hydrochloric acid gas therefrom. It has also been proposed to distill a concentrated hydrochloric acid solution of, say, 30 to 35 per cent strength, whereby hydrochloric acid gas may be evolved until the composition of the aqueous solution is brought to that of the constant boiling point mixture, containing 20.24 per cent HCl at normal atmospheric pressure and having a boiling point of 110° C. Such distillation, however, is difficult to carry out in a practical way. Due to the extremely corrosive action of aqueous hydrochloric acid solutions upon all of the common structural metals, ordinary distillation equipment cannot be used for the purpose, so that it is necessary to employ acid resistant ceramic materials or the like which are poor conductors of heat and are also mechanically weak and fragile. Equipment constructed thereof is cumbersome, inefficient and subject to excessive breakage.

I have now discovered a method and means for distilling aqueous hydrochloric acid solutions whereby necessity for transfer of heat through walls or partitions of poorly heat conducting material is avoided and a greater economy of heat utilization is realized than has been possible with the methods and apparatus heretofore in use. To the accomplishment of the foregoing and related ends, the invention, then, consists in the method and means hereinafter fully described and particularly pointed out in the claims.

The annexed drawing shows diagrammatically an arrangement of apparatus adapted for carrying out my improved method.

Broadly speaking, the invention consists in distilling a strong aqueous hydrochloric acid solution in a suitable fractionating tower or column constructed of acid-proof material to evolve a strong acid gas therefrom, the heat required for the distillation or fractionation being provided by direct contact with hot vapors of the composition of the constant boiling point acid solution, i. e. approximately 20 per cent HCl and 80 per cent water. The acid content of the strong solution in excess of the constant boiling point composition is distilled off as gas, while the liquid effluent drawn off from the fractionating column consists of an acid solution of approximately constant boiling point strength at substantially the boiling point temperature, i. e. 110° C. To supply the hot vapors required for carrying out the distillation a portion of the aforesaid effluent is mixed with a hot concentrated solution of a hygroscopic metallic chloride, e. g. calcium chloride, whereby the acid content thereof is largely vaporized, along with some water vapor. The diluted chloride solution is then neutralized and boiled at atmospheric pressure to reconcentrate the same and the concentrated solution is returned for mixing with further effluent. The steam given off from the boiling chloride solution is united with the hydrochloric acid gas previously evolved in mixing the two solutions, as just described, the amount and composition of the mixed gases and vapors approximating that of the constant boiling point solution so treated. The aqueous acid vapors are returned to the fractionating column to supply the heat required herein.

In effect, then, a quantity of constant-boiling point acid is continuously recycled as the heat transmitting medium for effecting the distillation. The calcium chloride solution is likewise continuously recycled as the heat transmitting medium for supplying heat to the circulating constant boiling point acid. The advantage of such procedure is that usual metallic concentrating equipment may be used for heating the calcium chloride solution without undue corrosion, thus providing for the most efficient heat transfer from the original steam to the chloride through metallic walls or partitions. The heat of the calcium chloride solution is then transfered by direct contact to the recycled constant boiling point acid and in turn from the latter to the acid solution distilled in the fractionating column, with a minimum loss of heat in the process.

The distillation system just described is advantageously combined with one for absorbing a dilute acid gas in a solution of constant boiling point composition discharged as effluent from the distillation column to produce the strong aqueous acid solution for the distillation. The combined arrangement of apparatus is illustrated diagrammatically in the drawing. An absorber 1 of any suitable design, such as a scrubbing tower or a series of tourilles, etc., is connected by pipe 2 with a source of supply of hydrochloric acid gas. The absorbing solution is introduced through a pipe 3 and the strong acid solution is removed through pipe 4, while outlet 5 serves to carry away unabsorbed inert gases. Pipe 4 connects with the top of a distilling column 6, which may be in the form of a scrubbing tower provided with packing material, all of acid-proof character. The hot vapors supplying heat for the distillation are introduced by pipe 7 into the base of column 6, and the effluent from the latter is discharged through pipe 8 into a receiver 9. The strong acid vapors pass from the top of column 6 through vapor outlet 10 to reflux condenser 11, the aqueous condensate from which is returned by pipe 12 to the column, while the rich acid gas is removed through pipe 13 to storage or a point of use. The outlet from receiver 9 is through a branched pipe provided with control valves, branches 14 and 15 leading, respectively, to cooler 16 and flash tank 17. A portion of the solution from receiver 9 is conducted through branch 14 to a cooler 16, and the cooled solution flows to storage tank 18, whence it is withdrawn by pump 19 and returned to absorber 1 through pipe 3.

Another portion of solution from receiver 9 is conducted through branch 15 to flash tank 17 wherein it is mixed with a hot concentrated calcium chloride solution introduced thereinto by pipe 20. Acid vapors evolved are removed through vapor pipe 21 connected to pipe 7. The diluted calcium chloride solution flows through pipe 22 to the top of a fractionating column 23. In the latter column the solution is steamed out to remove residual acid, and the vapors pass off through pipe 24 connected to pipe 7. The solution from column 23 flows through pipe 25 to a neutralizer 26, wherein the last traces of acid are neutralized by addition of lime or calcium carbonate. The neutral solution is conducted by pipe 27 to boiler 28 heated by steam coils 29, wherein the solution is reconcentrated. The steam from boiler 28 is conducted by vapor pipe 30 to the base of steaming-out column 23, and the concentrated solution is withdrawn by pump 31 and returned to flash tank 17 by pipe 20.

For operating the system just described the dilute hydrochloric acid gas, from whatever source derived, is led in through pipe 2 to absorber 1 wherein it is absorbed in a 20 per cent HCl solution to form a concentrated acid solution which, for purpose of illustration, will be assumed to be of 30 per cent strength. The 30 per cent HCl solution from absorber 1 is introduced into the top of fractionating column 6 wherein it flows downwardly in countercurrent to the hot 20 per cent HCl vapors, which are introduced into the base thereof at a temperature of approximately 130° C. By introducing the heat required for the distillation by means of vapors of constant boiling point acid composition, there is no dilution of the distilled acid. The rate of flow in column 6 is preferably regulated to maintain a vapor temperature of approximately 70° C. at the top of the column. The excess of HCl in the feed solution above the constant boiling point composition is vaporized and passes off from the top of the column, is cooled to about 40° C. in the reflux condenser 11 to separate most of the water therein, so that the final gases removed have a content of over 95 per cent HCl. The solution collected in the base of column 6 consists of approximately 20 per cent acid solution at substantially the boiling point thereof, i. e. 110° C, The hot 20 per cent HCl solution collected in receiver 9 is divided, under normal operating conditions, so that the portion conducted to cooler 16 corresponds in volume to the strong acid solution coming from absorber 1, while the portion diverted to flash tank 17 corresponds to the condensate from the vapors employed for supplying heat to the fractionating column 6.

The cooled 20 per cent HCl solution is returned to absorber 1 to absorb a further amount of HCl gas. The portion of 20 per cent HCl diverted to flash tank 17, at a temperature slightly below 110° C., is mixed with a strong calcium chloride solution heated to a temperature materially above 110° C., for example, a 60 per cent CaCl₂ solution heated to a temperature of approximately 150° C., the proportions by weight of acid solution and CaCl₂ solution in such case being preferably about 1 to 6. By mixing the two solutions in suitable proportions nearly all of the HCl content of the acid solution may be vaporized, or "flashed," along with some water vapor, so that the liquid discharge from flash tank 17 may contain not more than 0.2 per cent HCl, the temperature thereof being about 130° C. Most of the remaining acid in the solution may be steamed out in column 23, the discharge from which may be obtained with as little as 0.01 per cent HCl.

The steam from column 23 is mixed with the acid vapors from flash tank 17, and the combined vapors, having approximately the same composition as the constant boiling point solution, and being superheated to a temperature of approximately 130° C., are returned to the distilling column 6 to supply the heat required therein.

The de-acidified solution discharged from steaming-out column 23 is advisedly neutralized by addition of sufficient lime or calcium carbonate, the quantity required being relatively very small, so as to prevent corrosion of the steam coils and walls of boiler 28. The neutralized solution, containing about 50 per cent $CaCl_2$, is then reconcentrated in boiler 28 to approximately 60 per cent $CaCl_2$ content at the atmospheric boiling point temperature thereof, i. e. 150° C. The quantity of water evaporated in this step naturally corresponds to that taken up from the acid solution in flash tank 17, allowing for the water vaporized in the latter. The combined acid and water vapor from flash tank 17 and boiler 28, then, corresponds to the amount of 20 per cent acid solution introduced into tank 17. such combined vapors being superheated to about 130° C. By returning the superheated vapors to the fractionating column 6 to supply the heat required therein, a continuous recycling of constant boiling point acid is achieved involving alternate condensing and vaporizing thereof. The series of operations involved may be carried out in apparatus constructed of acid-proof and heat-insulating materials without necessity for transmitting heat directly through the walls thereof from any external source.

The heat requirement of the entire system is introduced through the steam heating coils in boiler 28. The boiler and coils may be of usual design and constructed of usual structural metals, since the equipment does not come into direct contact with corrosive acid solutions. The hot concentrated solution from boiler 28, which is returned to flash tank 17, and the steam returned to column 23 and thence to the fractionating column 6, carry the heat required to maintain the distillation in continuous operation.

If desired, the steaming-out column 23 may be omitted, since the acid vapors liberated therein merely reduces the lime requirement for neutralizing by a small amount. In such case the discharge from flash tank 17, containing about 0.2 per cent HCl, would be conveyed directly to neutralizer 26. This mode of operation would increase the amount of lime required, thereby entailing a gradual accumulation of calcium chloride in the system, which would be offset by draining off a small amount thereof from time to time so as to maintain an approximately constant volume of the salt solution in circulation. Obviously, the neutralization step might also be dispensed with if the boiler 28 and steam coils were constructed of special acid-resistant steel or other metal not seriously attacked by the boiling solution having an acid content as low as 0.2 per cent HCl. Such acid-proof metal equipment, however, is much more costly than usual steel apparatus, and in most cases it would doubtless be more economical to neutralize the solution and hence avoid the extra capital cost of acid-resistant apparatus and the possible wear and tear thereon caused by acid corrosion.

Considerable variation is permissible in the strength of the calcium chloride solution employed, and in the proportions with which it is mixed with the constant boiling point acid effluent. The chloride solution should be of such concentration that the boiling point thereof is materially higher than 110° C., for example, from 50 to 70 per cent $CaCl_2$. The relative amounts of 20 per cent HCl solution and of concentrated $CaCl_2$ solution to be taken depend upon the temperature and strength of the latter and the degree of de-acidification desired in the mixing operation, but in general may vary between 3 and 10 parts of $CaCl_2$ solution to 1 part of 20 per cent HCl solution by weight. The figures given are illustrative, however, and not to be construed as limiting the invention.

In the foregoing detailed description, reference has been had particularly to a method for absorbing weak HCl gas to form a concentrated solution thereof and then distilling the solution to evolve therefrom a strong acid gas. The improved method of distillation, however, may be applied to the distillation of any aqueous hydrochloric acid solution of any strength above the constant boiling point composition, whether or not the distillate is to be a strong acid gas or an aqueous acid mixture, simply by recycling a sufficient volume of constant boiling point acid in the manner described to supply the heat requirement for such distillation. In such way, for instance, a purified distilled aqueous acid of any desired strength above 20 per cent HCl may be prepared.

Solutions of other hygroscopic metallic chlorides may be employed for the heat transmitting solution in the process instead of calcium chloride, e. g. magnesium chloride, zinc chloride, strontium chloride, etc. The invention is intended to comprehend the use of such chloride solutions as the equivalent of a calcium chloride solution.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of preparing a strong hydrochloric acid gas which comprises fractionally distilling an aqueous solution thereof having a concentration in excess of that of the constant boiling point composition by directly contacting the same with heated aqueous acid vapors of approximately constant boiling point composition, removing acid gases evolved, discharging a residual solution of approximately constant boiling point composition, mixing a portion of such residual solution with a hot concentrated calcium chloride solution at a temperature materially above 110° C., whereby the acid content thereof is substantially vaporized, boiling the thereby diluted calcium chloride solution to reconcentrate the same, mixing the water vapor thereby evolved with the acid vapors from said mixing step and returning the mixed vapors to said distilling step for the heated aqueous acid vapors therein.

2. The method of preparing a strong hydrochloric acid gas which comprises fractionally distilling an aqueous solution thereof having a concentration in excess of that of the constant boiling point composition by directly contacting the same with heated aqueous acid vapors of approximately constant boiling point composition, removing acid gases evolved, discharging a residual solution of approximately constant boiling point composition, mixing a portion of such residual solution with a hot concentrated calcium chloride solution at a temperature materially above 110° C., whereby the acid content thereof is substantially vaporized, neutralizing the resulting diluted calcium chloride solution, boiling the de-acidified solution to reconcentrate the same, mixing the water vapor thereby evolved with the acid vapors from said mixing step and returning the mixed vapors to said distilling step for the heated aqueous acid vapors therein.

3. The method of preparing a strong hydrochloric acid gas which comprises fractionally distilling an aqueous solution thereof having a concentration in excess of that of the constant boiling point composition by directly contacting the same with heated aqueous acid vapors of approximately constant boiling point composition, removing acid gases evolved, discharging a residual solution of approximately constant boiling point composition, mixing a portion of such residual solution with a hot concentrated calcium chloride solution at a temperature materially above 110° C., whereby the acid content thereof is substantially vaporized, steaming out the resulting diluted calcium chloride solution to drive off additional acid vapors, neutralizing the residual solution, boiling the de-acidified solution to reconcentrate the same, introducing the water vapor thereby evolved to said steaming-out step, combining the vapors from said steaming-out step and said mixing step, returning the mixed vapors to said distilling step and returning the reconcentrated calcium chloride to said mixing step.

4. The method of concentrating a dilute hydrochloric acid gas to produce a strong acid gas which comprises absorbing such weak gas in an aqueous hydrochloric acid solution of approximately constant boiling point composition to produce a concentrated acid solution, fractionally distilling such concentrated solution by directly contacting the same with heated aqueous acid vapors of approximately constant boiling point composition, whereby strong acid gas is evolved and a residual solution of approximately constant boiling point composition is discharged, cooling and returning a portion of such residual solution to said absorbing step, mixing another portion of the uncooled residual solution with a hot concentrated calcium chloride solution at a temperature materially above 110° C., whereby the acid content thereof is substantially vaporized, boiling the thereby diluted calcium chloride solution to reconcentrate the same, mixing the water vapor thereby evolved with the acid vapors from said mixing step and returning the mixed vapors to said distilling step for the heated aqueous acid vapors therein.

5. The method of concentrating a dilute hydrochloric acid gas to produce a strong acid gas which comprises absorbing such weak gas in an aqueous hydrochloric acid solution of approximately constant boiling point composition to produce a concentrated acid solution, fractionally distilling such concentrated solution by directly contacting the same with heated aqueous acid vapors of approximately constant boiling point composition, whereby strong acid gas is evolved and a residual solution of approximately constant boiling point composition is discharged, cooling and returning a portion of such residual solution to said absorbing step, mixing another portion of the uncooled residual solution with a hot concentrated calcium chloride solution at a temperature materially above 110° C., whereby the acid content thereof is substantially vaporized, neutralizing the resulting diluted calcium chloride solution, boiling the de-acidified solution to reconcentrate the same, mixing the water vapor thereby evolved with the acid vapors from said mixing step and returning the mixed vapors to said distilling step for the heated aqueous acid vapors therein.

6. The method of concentrating a dilute hydrochloric acid gas to produce a strong acid gas which comprises absorbing such weak gas in an aqueous hydrochloric acid solution of approximately constant boiling point composition to produce a concentrated acid solution, fractionally distilling such concentrated solution by directly contacting the same with heated aqueous acid vapors of approximately constant boiling point composition, whereby strong acid gas is evolved and a residual solution of approximately constant boiling point composition is discharged, cooling and returning a portion of such residual solution to said absorbing step, mixing another portion of the uncooled residual solution with a hot concentrated calcium chloride solution at a temperature materially above 110° C., whereby the acid content thereof is substantially vaporized, steaming out the resulting diluted calcium chloride solution to drive off additional acid vapors, neutralizing the residual solution, boiling the de-acidified solution to reconcentrate the same, introducing the water vapor thereby evolved to said steaming-out step, combining the vapors from said steaming-out step and said mixing step, returning the mixed vapors to said distilling step and returning the reconcentrated calcium chloride to said mixing step.

7. In a method of distilling an aqueous hydrochloric acid solution, the steps which consist in mixing a hot aqueous hydrochloric acid solution of approximately constant boiling point composition with a hot concentrated solution of a hygroscopic metallic chloride to produce a mixture having a temperature materially above 110° C., whereby the hydrochloric acid content of said first solution is substantially vaporized, and passing such hot aqueous acid vapors in direct contact with an aqueous hydrochloric acid solution of higher concentration than that of the constant boiling point composition to distill therefrom the acid content in excess of the constant boiling point composition by transfer of heat from said hot acid vapors.

8. In a method of distilling an aqueous hydrochloric acid solution, the steps which consist in mixing a hot aqueous hydrochloric acid solution of approximately constant boiling point composition with a hot concentrated calcium chloride solution to produce a mixture having a temperature materially above 110° C., whereby the hydrochloric acid content of said first solution is substantially vaporized, and passing such hot aqueous acid vapors in direct contact with an aqueous hydrochloric acid solution of higher concentration than that of the constant boiling point composition to distill therefrom the acid content in excess of the constant boiling point composition by transfer of heat from said hot acid vapors.

9. In a method of distilling an aqueous hydrochloric acid solution, the steps which consist in mixing a hot aqueous hydrochloric acid solution of approximately constant boiling point composition with a hot concentrated magnesium chloride solution to produce a mixture having a temperature materially above 110° C., whereby the hydrochloric acid content of said first solution is substantially vaporized, and passing such hot aqueous acid vapors in direct contact with an aqueous hydrochloric acid solution of higher concentration than that of the constant boiling point composition to distill therefrom the acid content in excess of the constant boiling point composition by transfer of heat from said hot acid vapors.

10. The method of preparing a strong hydrochloric acid gas which comprises fractionally distilling an aqueous solution thereof having a concentration in excess of that of the constant boiling point composition by directly contacting the same with heated aqueous acid vapors of approximately constant boiling point composition, removing acid gases evolved, discharging a residual solution of approximately constant boiling point composition, mixing a portion of such residual solution with a hot concentrated solution of a hygroscopic metallic chloride at a temperature materially above 110° C., whereby the acid content thereof is substantially vaporized, boiling the thereby diluted chloride solution to reconcentrate the same, mixing the water vapor thereby evolved with the acid vapors from said mixing step and returning the mixed vapors to said distilling step for the heated aqueous acid vapors therein.

Signed by me this 30 day of June 1931.

SHELDON B. HEATH.